(12) United States Patent
Ari et al.

(10) Patent No.: US 8,688,904 B1
(45) Date of Patent: Apr. 1, 2014

(54) METHOD FOR MANAGING DATA STORAGE

(75) Inventors: Ismail Ari, San Jose, CA (US); Melanie M. Gottwals, San Jose, CA (US); Richard H. Henze, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1305 days.

(21) Appl. No.: 11/136,593

(22) Filed: May 23, 2005

(51) Int. Cl.
*G06F 12/00* (2006.01)

(52) U.S. Cl.
USPC ........... 711/111; 711/148; 711/166; 711/100; 711/105; 711/112; 711/113; 711/114; 711/133; 711/147; 711/165

(58) Field of Classification Search
USPC ......... 711/111–114, 100, 105, 133, 147–148, 711/165–166
See application file for complete search history.

(56) References Cited

U.S. PATENT DOCUMENTS

| | | | |
|---|---|---|---|
| 4,744,050 A | | 5/1988 | Hirosawa et al. |
| 6,260,115 B1 * | | 7/2001 | Permut et al. ................ 711/134 |
| 6,324,620 B1 * | | 11/2001 | Christenson et al. ......... 711/112 |
| 6,779,078 B2 * | | 8/2004 | Murotani et al. ............. 711/112 |
| 6,941,432 B2 * | | 9/2005 | Ronstrom ..................... 711/165 |
| 7,096,337 B2 * | | 8/2006 | Yagi et al. ..................... 711/165 |
| 2006/0026229 A1 * | | 2/2006 | Ari et al. ........................ 709/203 |

OTHER PUBLICATIONS

Korupolu, et al. "Coordinated Placement and Replacement for Large-Scale Distributed Caches" Workshop on Internet Applications, Jul. 1999, Dep of Computer Science, Univ of TX.
Korupolu, et al. "Coordinated Placement and Replacement for Large-Scale Distributed Caches" IEEE Transactions on Knowledge and Data Engineering, vol. 14, No. 6, Nov./Dec. 2002.
Wong, et al. "My Cache or Yours? Making Storage More Exclusive" USENIX Annual Technical conference (USENIX 2002) pp. 161-175, Jun. 10-15, 2002, Monterey, CA.

* cited by examiner

*Primary Examiner* — Tuan Thai
*Assistant Examiner* — Zhuo Li

(57) ABSTRACT

A number of accesses of a portion of data at a first storage device is accumulated. The number of accesses is periodically decremented by a predetermined amount. Based at least in part on the number of accesses, it is determined whether the portion of data of is a candidate for migration to a second storage device.

18 Claims, 4 Drawing Sheets

100

METHOD FOR MANAGING DATA STORAGE

TECHNICAL FIELD

Embodiments of the present invention relate to managing data storage.

BACKGROUND

As the use of computers continues to proliferate, large organizations and/or enterprises have acquired computers from a wide variety of platforms and/or models and networked these computers together. Computers from a wide variety of platforms and/or models are also known as heterogeneous computers. Storage area networks (SAN) were developed to provide storage for the heterogeneous computers by providing a high-speed network of shared storage devices. A SAN architecture, typically, makes all storage devices available to many of the computers in a large network, such as those associated with large organizations and/or companies. In this case, the SAN architecture may pool the storage devices, for example, to ease the management of the storage devices.

Various methods of increasing the I/O rates for accessing data between computers and storage devices have been developed. Frequently, storage devices provide different levels of access latency times, throughput expressed as Input/Output (I/O) rates, and/or transfer rates, for reading data from the storage devices and for writing data to the storage devices. Storage devices, such as caches, system memory, or solid state devices (SSD), that provide, for example, fast access latency, throughput, I/O rates and/or transfer rates (referred to hereinafter as "fast storage devices") may be used to permanently or temporarily store data as it is being communicated between applications executing on computers and storage devices that provide, for example, slower access latency, throughput, IO rates and/or transfer rates (referred to hereinafter as "slower storage devices"). When an application requests to write data, the data may be stored first in fast storage devices and then later stored in the slower storage devices. When the data is written to the fast storage device the application is informed that the data has been stored and, therefore, does not have to wait until the data is actually stored on the slower storage device.

Many of these methods have been used to speed up the communication of data between computers, such as clients, and the storage devices over a SAN for the purpose of increasing I/O rates. However, current methods for improving the speed of communication of data are subject to overhead incurred as a result of migrations between levels in a multilevel cache environment (e.g., bandwidth, cache capacity, processing, etc.) For example, data may be placed into a cache once it has been accessed a particular number of times, even if the accesses to this data are infrequent and do not exhibit high temporal locality.

DISCLOSURE OF THE INVENTION

Various embodiments of the present invention, a method for managing data storage, are described herein. A number of accesses of a portion of data at a first storage device is accumulated. The number of accesses is periodically decremented by a predetermined amount. Based at least in part on the number of accesses, it is determined whether the portion of data of is a candidate for migration to a second storage device.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, and a data storage device such as a magnetic or optical disk and disk drive for storing information and instructions. The computer system may also include an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
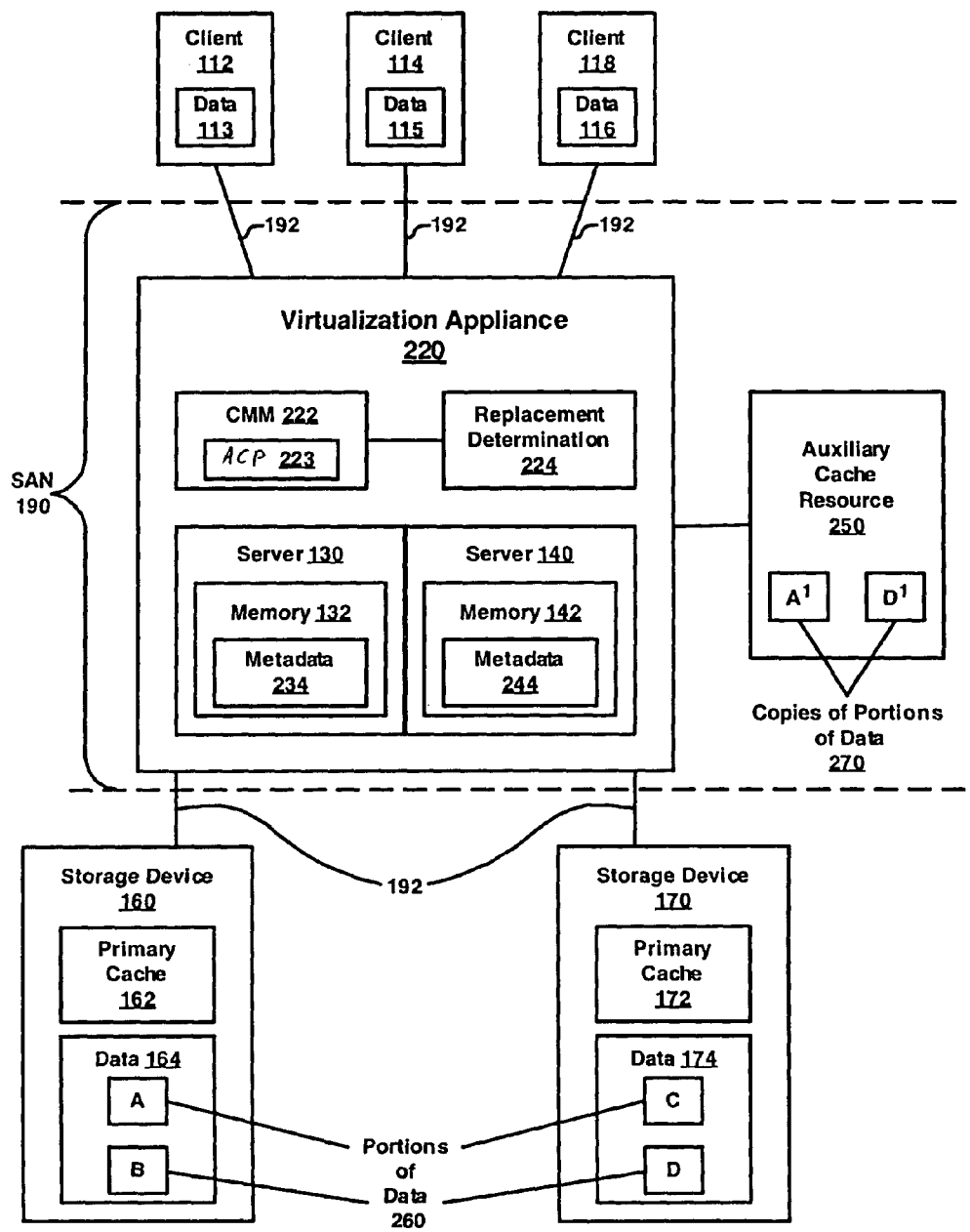
FIG. 1 is a block diagram of an exemplary system for managing data storage, according to embodiments of the present invention.

Overview of a System for Managing Data Storage Using a Caching Policy at the Storage Area Network (SAN) Level FIG. 1 is a block diagram of a system 100 for managing data storage, in accordance with one embodiment of the present invention. System 100 is operable to provide a caching policy at the storage area network (SAN) level, according to one embodiment. It should be appreciated that the blocks of FIG. 1 can be arranged differently than as illustrated, and can implement additional or fewer features than what are described herein. It should also be appreciated that the blocks of FIG. 1 may be included within a single computer system, may be distributed over a network, or any combination thereof.

As depicted in FIG. 1, applications executing on computers, such as clients 112, 114 and 118, communicate data to and/or from storage devices 160 and 170 over a SAN 190. Data 113, 115 and 116 associated with clients 112, 114 and 118, respectively, may be stored at storage devices 160 and 170 resulting in data 164 and 174. Data 164 and 174 may also be referred to herein as portions of data or chunks of data. Further, the stored data 164 and 174 may be cached on primary caches 162 and 172, respectively. Storage devices 160 and 170 may be Redundant Arrays of Independent Disks (RAIDs), according to one embodiment. The auxiliary cache resource 250 is a part of the SAN 190 (e.g. "at the SAN level"), according to one embodiment. Primary caches 162 and 172, according to one embodiment, may be array caches. FIG. 1 further depicts a virtualization appliance 220 that includes a cache management module (CMM) 222, an alternative caching policy (ACP) 223, a replacement determination 224, and metadata 234 and 244.

According to one embodiment, the virtualization appliance 220 is an "in-band" virtualization appliance. According to another embodiment, a virtualization system may be either an in-band virtualization appliance or an out-of-band virtualization system. For an out-of-band virtualization system, metadata about the control of virtualization functionality is separated from data traffic and maintained by a metadata server. The hardware, such as virtualization appliance 220, and interconnects 192 that connect the computers, such as clients 112, 114 and 118, to storage devices 160 and 170 in a SAN 190 is referred to as SAN fabric.

In one embodiment, the SAN fabric is operable to enable a many-to-many connectivity between the clients 112, 114 and 118 and the storage devices 160 and 170 associated with a SAN 190. Interconnects 192 may be Fibre Channel (FC) and/or Gigabit Ethernet (GigE), according to one embodiment.

In one embodiment, the CMM 222 provides an alternative caching policy 223 to the caching policy provided by the primary caches 162 and 172 associated with storage devices 160 and 170, respectively. For example, caches 162 and 172 are associated with relatively slower storage devices 160 and 170, respectively, and use a caching policy known as "demand based caching." Demand based caching operates such that data is always written to caches 162 and 172 when the data is first accessed either by reading the data or writing the data. For example, if an application on client 112 requests to read data 164 from storage device 160 for the first time, the data 164 will be stored in the primary cache 162. Similarly, if an application on client 112 requests to write the data 113 for the first time, the data 113 will be stored in the primary cache 162 assuming that storage device 160 is selected for the data 113 to be written to.

In one embodiment, in order to supplement the functionality of the caching policy provided by the primary caches 162 and 172, so as to provide exclusive caching, CMM 222 provides an alternative caching policy 223. In one embodiment, alternative caching policy 223 allows for the caching of data objects that are frequently accessed and subject to periodical cooling. Alternative caching policy 223 is also referred to herein as the Most Recently Frequently Used (MRFU) cache placement policy. The MRFU cache placement policy keeps track of all accesses to a data object. Periodically, the number of accesses is decremented. In one embodiment, the period is time-based. In another embodiment, the period is event-based (e.g., every 1000 accesses). This number is compared to a threshold to determine whether it is a candidate for migration to auxiliary cache resource 250. Accordingly, MRFU placement provides an improved placement policy by accounting for both frequency of access and temporal locality of access of data objects.

For example, the CMM 222 may determine that a portion of data associated with a storage device 160, such as portion of data A, is a candidate for migration to auxiliary cache resource 250. CMM 222 may migrate portions of data 260 to auxiliary cache resource 250 resulting in copies of portions of data 270. For example, a particular portion of data A may be migrated to auxiliary cache resource 250, for example, by associating a copy A' of that particular portion of data A with the auxiliary cache resource 250 in the event that the portion of data A has been accessed more than once. The copy A' will be accessed instead of the portion of data A for subsequent requests to access the portion of data A, according to another embodiment. In so doing, entities, such as applications executing on clients 112, 114 and 118 may experience faster access times and/or greater I/O rates when accessing the copies of the portions of data 270, such as copy A', than when accessing portions of data 260, such as portion of data A. Although for the sake of simplicity the descriptions herein refer to accessing the portions of data 260 and/or the copies of the portions of data 270, any subset of the portions of data 260 and/or the copies of the portions of data 270 may be accessed.

It should be appreciated that the threshold may be static or dynamic, according to various embodiments. For example, in one embodiment, the threshold is statically set to a predetermined number of accesses, such as three and never modified thereafter. If a particular portion of data 260, such as portion of data A, is accessed three times, then that portion of data A may be migrated to auxiliary cache resource 250. Then if another portion of data 260, such as portion of data B, is accessed three times, subject to the MRFU cache placement policy, the portion of data B may be migrated.

In another embodiment, the threshold may be a dynamic threshold that is modified to adapt to changing circumstances over time, according to still another embodiment. For example, the threshold may be related to a cost to benefit ratio, such as a cost of migrating portions of data 260 versus a benefit of getting cache hits for resident data.

In one embodiment, storage devices 160 and 170 include logic for detecting when an application associated with a client 112, 114 and 118 requests to access data 164 and 174 stored in the storage devices 160 and 170, respectively, in a sequential manner. For example, the storage devices 160 and 170 can provide data that it has in its cache 162 and 172, respectively, to the application faster than it can provide data 164 and 174 that it has to read with its mechanical actuators. Therefore, if a storage device 160 or 170 detects that an application executing on a client 112, 114 or 118 is accessing its data 164 or 174 sequentially, the storage device 160 or 170 may anticipate that the application will continue to access the data 164 or 174 sequentially and "pre-fetch" additional parts of its data 164 or 174 and store the pre-fetched data in its cache 162 or 172. Therefore, storage devices 160 and 170 provide optimal transfer rates for sequential accesses to data 164 and 174 stored in these storage devices 160 and 170.

According to another embodiment, CMM 222 provides an alternative caching policy 223 that does not allow portions of data 260 to be cached in the auxiliary cache resource 250 in the event that the portions of data 260 are being accessed sequentially at the storage devices 160 or 170. For example, if an application executing on client 114 is accessing portion of data B which is stored on storage device 160, the CMM 222 may detect that portion of data B is being accessed sequentially. In this case, CMM 222 may not allow portion of data B to be copied to auxiliary cache resource 250, thus, the application executing on client 114 will continue to access portion of data B on storage device 160 for subsequent accesses. The optimal transfer rates provided by the storage devices 160 and 170 for sequential accesses to data 164 and 174, respectively, will continue to be used. According to another embodiment, sequential accesses to portions of data 260 are counted as one access, for example, by the CMM 222, in the determination of access for that portion of data, to avoid caching portions of data 260 in the auxiliary cache resource 250 that are being accessed sequentially at storage devices 160 or 170.

Primary caches 162 and 172 cache data 164 and 174, respectively, in cache lines that are typically range from 1 kilobyte to 16 kilobytes in size. It should be appreciated that it may not be practical to use a very large cache line for demand based caching. Therefore, it would result in poor utilization of the cache resource while adding overhead associated with handling data that may not be accessed. According to yet another embodiment, CMM 222 provides an alternative caching policy 223 by caching portions of data 260 that are substantially larger than a cache line. In order for portions of data 260 to be cached on auxiliary cache resource 250, the portions of data 260 are migrated to auxiliary cache resource 250. Migration may be accomplished by selecting particular portions of data 260, such as portion of data A, reading the entire selected portion of data A, creating a copy A' of the selected portion of data A and migrating (for example by associating) the copy A' to the auxiliary cache resource 250.

According to one embodiment, the size of the portions of data 260 are large enough for the storage devices 160 and 170 to detect that the portions of data 260 are being accessed sequentially, for example, by an application executing on a client 112, 114 or 118. As already described herein, various types of storage devices 160 and 170, such as RAIDs, may have logic that enables them to provide optimal transfer rates for data that is being accessed sequentially. Migrating portions of data 260 to auxiliary cache resource 250, as already described herein, may take advantage of the ability of storage devices 160 and 170 to optimize transfer rates for sequential accesses. To continue the example, the migration of portion of data A may be optimized when the storage device 160 detects that portion of data A is being accessed sequentially when it is being read to create the copy A'.

According to one embodiment, portions of data 260 are substantially larger than a cache line. According to another embodiment, the portions of data 160 are at least 128K in order to benefit from optimal transfer rates, for example, due to sequential access detection, as already described herein.

In one embodiment, when a particular portion of data 260, such as portion of data B, is being migrated from the storage device 160 to auxiliary cache resource 250, other entities, such as applications executing on clients 112, 114 or 118, are not allowed to access the data 164 or 174 on storage device 160 in order to preserve consistency. The larger the portions of data 260 are, the longer it will take to migrate portion of data B to auxiliary cache resource 250 and the longer the other entities will have to wait. Therefore, the portions of data 260 may be large enough to allow storage devices 160 and 170 to detect sequential accesses of these portions of data 260 but at the same time not so large as to cause entities, such as applications, substantial waiting time that are, for example, greater than normal disk access and transfer time during migration processing. According to one embodiment, the size of the portions of data 260 is small enough to be migrated to the auxiliary cache resource without interfering with entities accessing data 164 and 174 associated with a storage device 160 and 170, respectively. According to another embodiment, the size of the portions of data 260 is less than 10 megabytes.

In one embodiment, providing an alternative caching policy 223 results in the primary caches 162 and 172 and the auxiliary cache resource 250 being used for different types of accesses thereby leveraging the primary caches 162 and 172 and the auxiliary cache resource 250 for the types of access behavior that each is best suited for, according to an embodiment. For example, typically storage devices that have mechanical actuators and logic for detecting sequential accesses are relatively good at sequential accesses and relatively poor at random accesses. Storage devices that do not have mechanical actuators are relatively good at random accesses.

Therefore, according to one embodiment, data that is sequentially accessed is stored at the storage devices 160 and 170, thus utilizing the logic of storage devices 160 and 170 for detecting sequential accesses. Further, relatively small amounts data (e.g., the size of a cache line or smaller, for example) that are accessed randomly but have not exhibited sufficient access activity within a portion of data sufficient to cause migration to the auxiliary cache resource 250 are stored at storage devices 160 and 170, such as RAIDs, and potentially cached in the primary caches 162 and 172, respectively, thus improving the performance of the storage devices 160 and 170 during random accesses in the described embodiment.

In contrast, relatively large amounts of data (e.g., copies of portions of data 170 that range from approximately the size of a cache line to 10 megabytes, for example) that exhibit sufficient activity in their access patterns may be cached at auxiliary cache resources 250, such as solid state devices (SSDs), utilizing the auxiliary cache resource's 250 good performance when performing random accesses, according to one embodiment. According to one embodiment of the invention, exclusivity between the contents of the copies of portions of data 270 associated with the auxiliary cache resource 250 and the portions of data that are cached in the primary caches 162 and 172 is promoted.

Virtualization

Virtualization is one part of providing a many-to-many connectivity between clients 112, 114 and 118 and storage devices 160 and 170 in such a way that allows physical entities, such as clients, applications, file systems, and storage devices, to not be aware of the physical characteristics of other physical entities. Further, virtualization allows for continuous data availability by providing multiple paths to data. In general, virtualization involves the renaming or remapping of one entity, such as a physical entity, to another entity, such as a logic entity. For example, the physical entities, such as storage devices 160 and 170, may be partitioned into smaller pieces or grouped together into a logical entity, known as a Logical Unit and identified with a Logical Unit Number (LUN). Further, physical entities may be grouped according to LUNs. Also, individual LUNs may be associated with individual entities, such as a particular client, application, file system, or storage device.

Disk array LUNs may configured together or "pooled" to higher level LUNs (e.g., SAN-level LUNs) through a virtualization appliance. For example, LUN X may be assigned to a particular storage device 160 and LUN Y assigned to storage device 170. These disk array LUNs may be configured together or "pooled" by the virtualization appliance 220 to create a new SAN-level LUN, for example LUN Z. LUN Z can then be mapped by the virtualization appliance 220 to a particular application that executes on client 114. Data from the application on client 114 will now be stored on storage devices 160 and 170.

In one embodiment, the alternative caching policy 223 automatically offloads work from the storage devices 160 and 170 to an auxiliary cache resource 250, such as an SSD, without requiring manual intervention from a system administrator. According to one embodiment, the alternative caching policy 223 can be enabled only for selected LUNs.

The virtualization appliance 220 may cache data in its system memory 132 and 142 in addition to virtualizing, physical entities. Typically, a virtualization appliance 220 has at least two servers 130, 140. The virtualization appliance 220 may hold copies of data that applications executing on clients 112, 114 and 118 operate on in system memory 132 and 142 that is associated with the two servers 130 and 140, respectively. Two exact copies of the same data may be held (also known as "mirroring") in system memory 132 and system memory 142.

Metadata

In general, metadata is data that describes data, for example where the data is stored and how it is accessed. Metadata 234 and 244 associated with the CMM 222 functionality describes which portions of the data 164 and 174 have been migrated to the auxiliary cache resource 250 and allows the virtualization appliance 220 to access the data from the appropriate location, either storage devices 160 or 170 or auxiliary cache resource 250, according to one embodiment. Metadata 234 and 244 associated with the CMM 222 functionality also describes statistics associated with portions of data 260, according to another embodiment. For example, in this case, metadata 234 and 244 may be used for determining whether the number of accesses to the portions of data 260 have reached a threshold, among other things. Metadata 234 and 244 may describe statistics associated with copies of portions of data 270 in addition to or instead of statistics associated with portions of data 260, according to another embodiment. In this case, the metadata 234 and 244 may be used to compute a dynamic threshold using a cost to benefit ratio, as will be described herein.

According to one embodiment, metadata 234 and 244 is held and mirrored in the virtualization appliance 220 in memories 132 and 142, respectively, as well as stored in stable storage. The in memory copy provides high-speed response, while the stable copy guarantees reliability and recovery after failures. For example, one copy of metadata 234 may be stored in the system memory 132 of one of the servers 130 associated with virtualization appliance 220 and an exact copy of the metadata 244 may be held in the system memory 142 of the other server 140 associated with the virtualization appliance 220. Mirroring the metadata 234 and 244 provides improved availability and disaster recovery of the metadata 234 and 244, according to one embodiment. It should be appreciated that mirroring the metadata 234 and 244 does not involve an undue amount of overhead since the size of the metadata 234 and 244 is manageable.

Most Recently Frequently Used (MRFU) Cache Placement Policy

As described above, alternative caching policy 223 is also referred to herein as the MRFU cache placement policy. The MRFU cache placement policy keeps track of all accesses to a data object. Periodically, the number of accesses is decremented. This number is compared to a threshold to determine whether it is a candidate for migration to auxiliary cache resource 250. Accordingly, MRFU placement provides an improved placement policy by accounting for both frequency of access and temporal locality of access of data objects.

Figure 2:
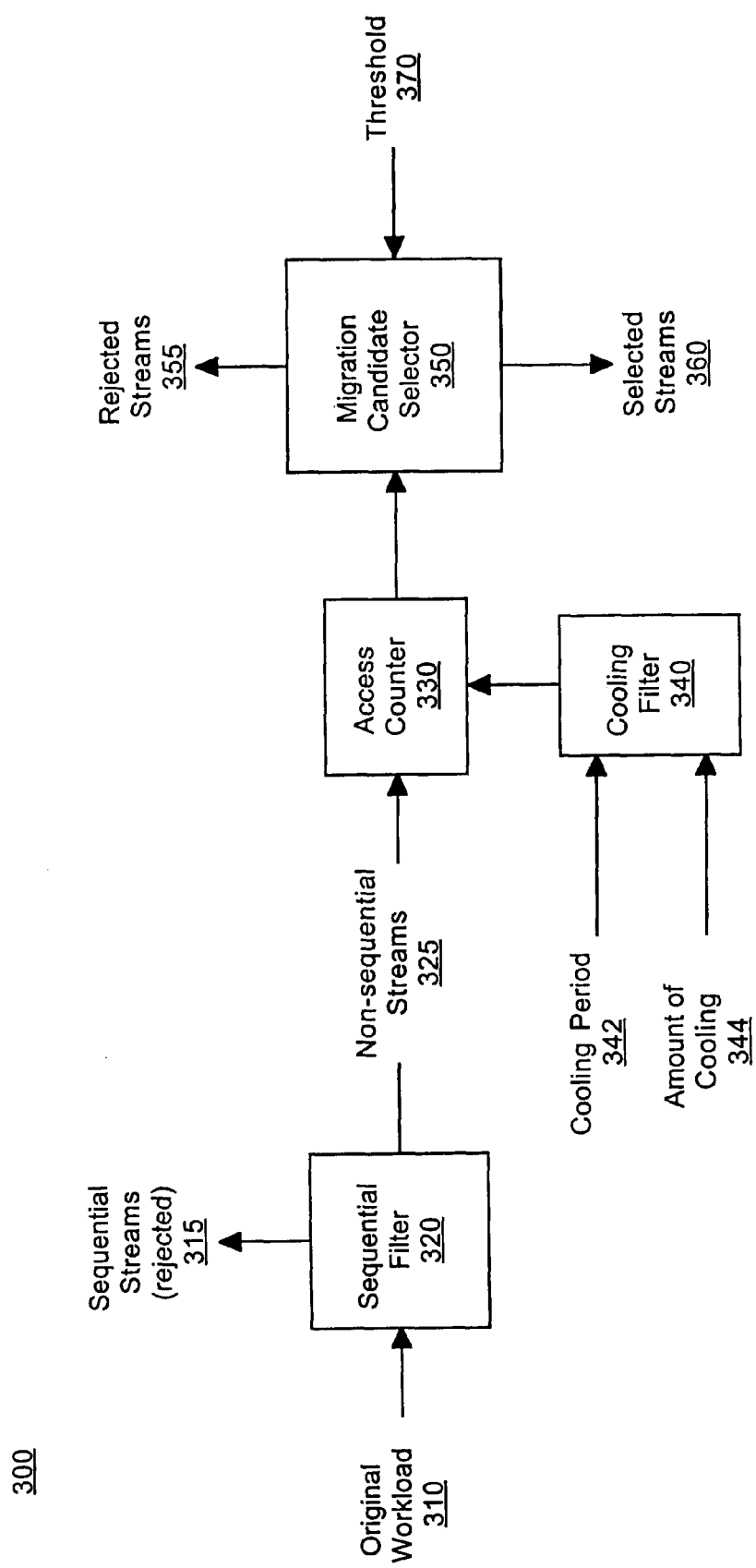
FIG. 2 is a data flow diagram of a Most Recently Frequently Used (MRFU) cache placement policy, according to embodiments of the present invention.

FIG. 2 is a data flow diagram of a Most Recently Frequently Used (MRFU) cache placement policy 300, according to embodiments of the present invention. In one embodiment, MRFU cache placement policy 300 is implemented within alternative caching policy 223 of system 100 of FIG. 1. MRFU cache placement policy includes sequential filter 320, access counter 330, cooling filer 340, and migration candidate selector 350. It should be appreciated that MRFU cache placement policy 300 may be implemented as software, hardware, or firmware, or any combination thereof.

MRFU cache placement policy 300 receives original workload 310 indicating access to a portion of data at a first storage device (e.g., storage device 160 or 170 of FIG. 1). In one embodiment, every access to data of the first storage is received. Sequential filter 320 receives original workload 310 and determines whether original workload 310 includes a sequential stream. As described above, it may be desirable to not migrate sequential streams to a cache, because these streams may be serviced faster directly from the first storage device. Accordingly, in one embodiment, sequential streams 315 are rejected at sequential filter 320.

Non-sequential streams 325 are received at access counter 330, which is operable to accumulate a number of accesses to the portion of data. In one embodiment, access counter 330 accumulates and maintains the number of accesses for each portion of data of a storage device within a migration candidate list. In order to improve usage of the cache, MRFU cache placement policy 300 periodically "cools" the migration candidate list by decrementing access counts of the listed candidates according to cooling filter 340. This clears the list from the unwanted, cooler chunks and leaves only the most recently frequently used chunks of data as candidates.

In one embodiment, MRFU cache placement policy 300 is tunable according to two parameters: cooling period 342 (e.g., a time interval) and the amount of cooling 344 (reduction in access counts) per period. For example, the access counts may be reduced by 1 every 30 seconds. It should be appreciated that these two parameters may be combined into one by defining a new metric called "cooling rate", which is equal to amount of cooling 344 divided by cooling period 342. However, it should be appreciated that the effects of same rates (e.g., 1/30, 2/60) with different periods would not necessarily be the same. Therefore, the selection of a good cooling period 342 may be handled on a case-by-case basis. For example, too much cooling could clear all candidates and stop migrations, while too little cooling would not be able to filter the cooler chunks. Moreover, it should be appreciated that cooling period 342 and amount of cooling 344 may be dynamically tunable.

The cooling can be increased by decreasing the cooling period 342 or by increasing the amount of cooling 344. In one embodiment, the access count is not decremented below zero, as a chunk with zero access count is not considered an active chunk or a candidate for migration.

Migration candidate selector 350 selects streams for migration to a cache based on the access count. In one embodiment, the access count subject to cooling filter 340 is compared to a threshold 370. It should be appreciated that threshold 370 may be static or dynamic. In one embodiment, if the access count is higher than the threshold, the associated stream is selected as a candidate for migration. In one embodiment, selected streams 360 are forwarded to a migration candidate list, for further consideration in determining whether they should be migrated to the cache. For example, the further consideration may be based on bandwidth load or CPU threads. Rejected streams 355 are not forwarded to the migration candidate list.

The importance of better selection increases with increasing migration rate and decreasing cache capacity. In one embodiment, MRFU cache placement policy 300 selects fewer chunks of data while maintaining the similar hit rates to the contents of the cache as compared to other cache placement policies. MRFU cache placement policy 300 also advantageously has a stabilizing effect on the threshold adaptation process.

The Replacement Determination

With reference to FIG. 1, a replacement determination 224 is used for determining which copies of the portions of data 270 will be removed from auxiliary cache resource 250, according to one embodiment in order to preferentially migrate more valuable portions of data 270 to the auxiliary cache resource 250. Replacement determination 224 may use an existing replacement determination, such as CLOCK, Least Recently Used (LRU), Adaptive Replacement Cache (ARC), or Adaptive Caching using Multiple Experts (ACME), according to another embodiment.

According to still another embodiment, replacement determination 224 may use a new replacement determination. For example, replacement determination 224 may use a cost to benefit ratio, as described herein, to determine what copies of portions of data 270 will be removed from auxiliary cache resource 250. According to yet another embodiment, auxiliary cache resource 250 may use a new replacement determination, such as the cost to benefit ratio as already described herein, to augment an existing replacement determination.

Dynamic Thresholds

As already stated, the threshold may be a dynamic threshold that is adjusted to adapt to changing circumstances over time, according to another embodiment. Further, the threshold may be driven by a dynamic cost to benefit ratio, according to still another embodiment. For example, a dynamic threshold can be based at least in part on a cost of associating a copy of a portion of data with the auxiliary caching resource that is weighted against a benefit of getting cache hits for resident data, according to one embodiment.

More specifically, there is a cost associated with migrating a particular portion of data C to the auxiliary cache resource 250 in terms of the system resources that will be used for the migration. Further, in order to migrate a portion of data C to auxiliary cache resource 250, something that is already in the auxiliary cache resource 250, such as either a copy of portion of data A' or D', may have to be removed from the auxiliary cache resource 250. Therefore, the benefit that may have resulted if a copy A', D' were allowed to remain in the auxiliary cache resource 250 will no longer continue when the copy A', D' is removed from the auxiliary cache resource 250. Therefore, according to one embodiment, the cost of associating a portion of data C may be weighed against the benefit of allowing a copy of another portion of data 270, such as A' or D', to continue to reside in the auxiliary caching resource 250. Further the costs and benefits change over time and as a function of the workload resulting in a dynamic threshold that may be adjusted to reflect these changing costs and benefits.

By dynamically adjusting the threshold, more portions of data 260 may be migrated when the benefits can be maximized and fewer portions of data 260 are migrated when costs outweigh the benefits.

A Process of Managing Data Storage

Figure 3A:
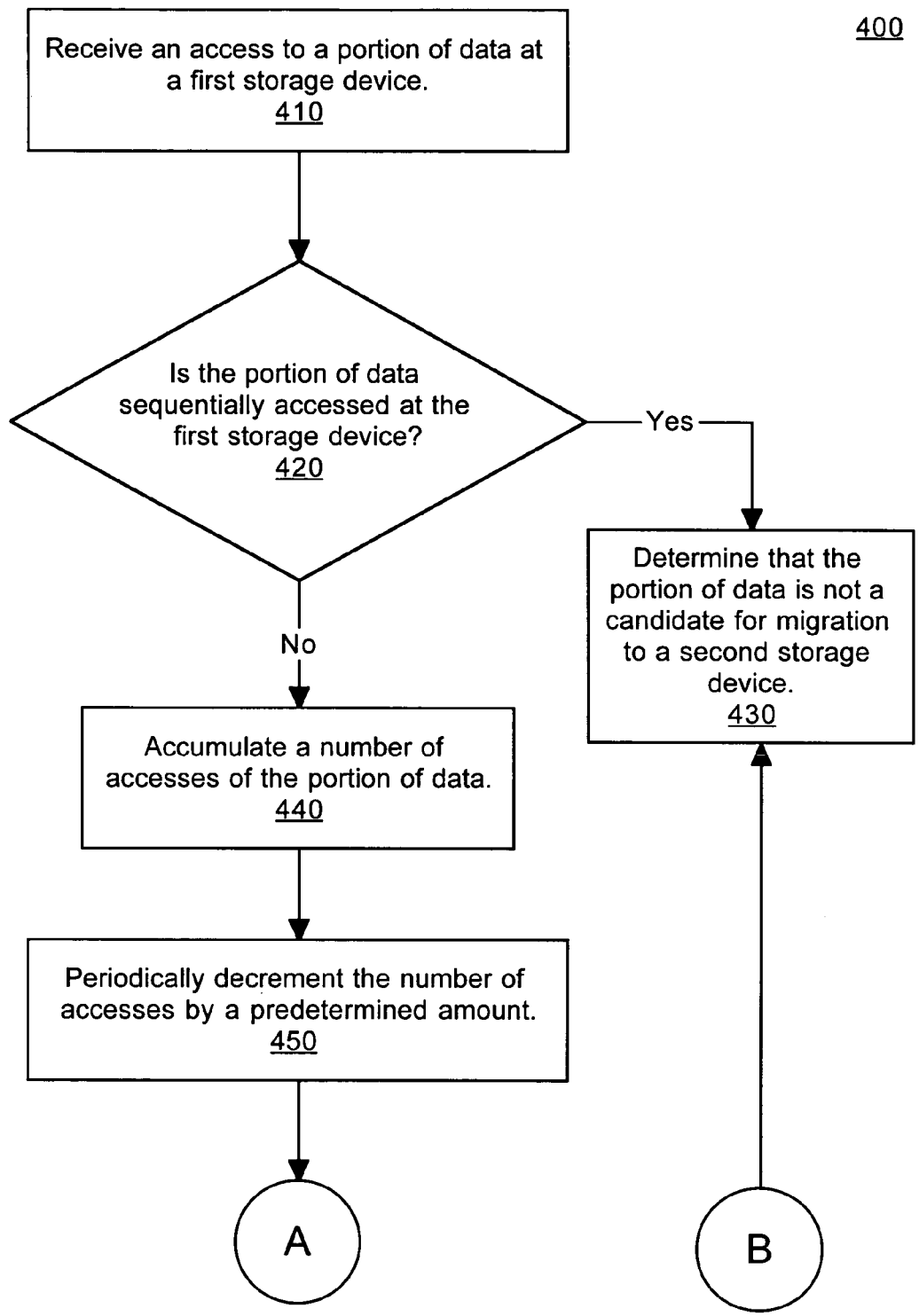
FIGS. 3A and 3B are a flowchart of a process for managing data storage, according to embodiments of the present invention.
Figure 3B:
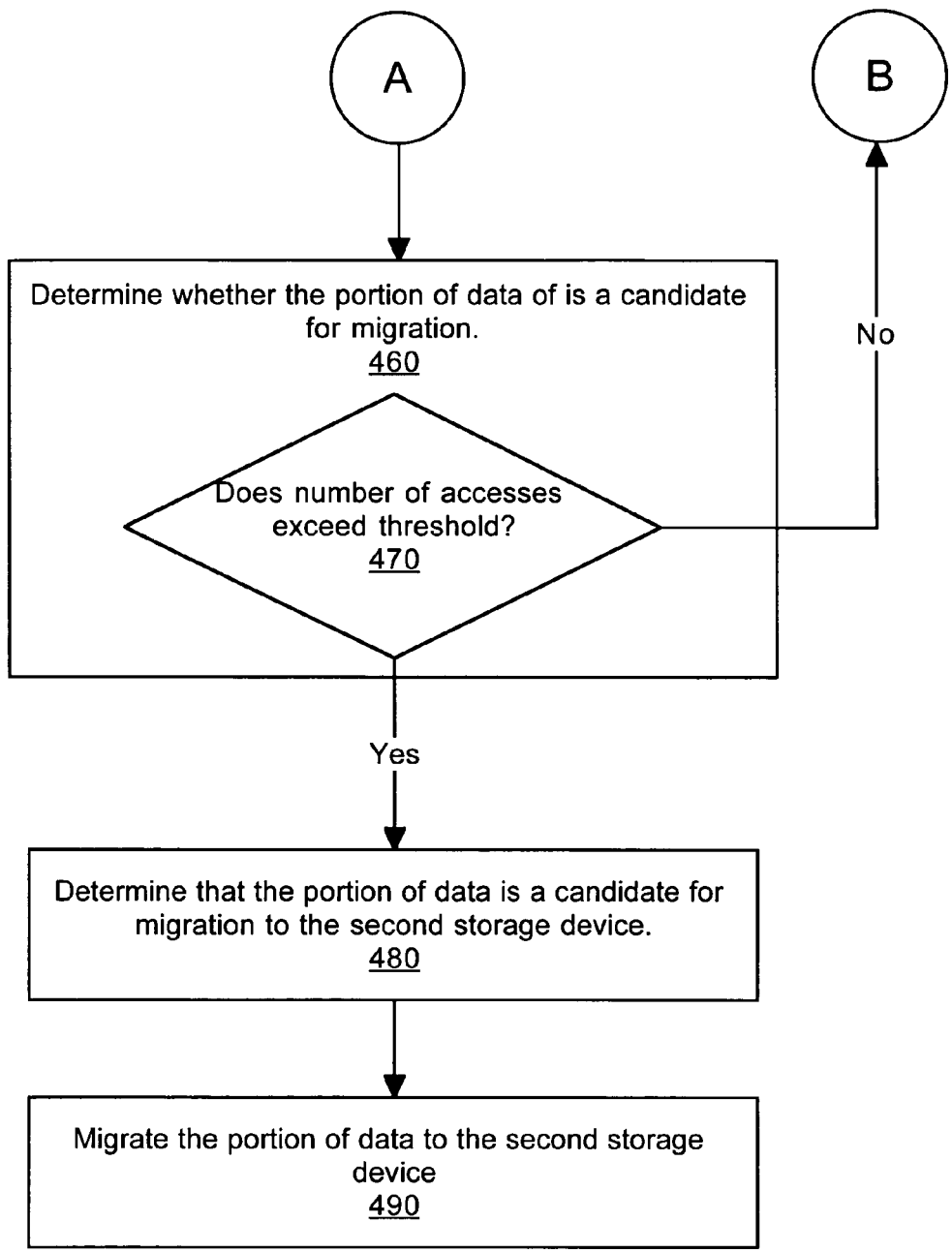

FIGS. 3A and 3B depict flowchart illustrating a process 400 of managing data storage, according to embodiments of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the embodiments described by flowchart 400 can be implemented using computer-readable and computer-executable instructions which reside, for example, in computer-usable media of a computer system or like device.

With reference to FIG. 3A, at step 410 of process 400, access to a portion of data (e.g., chunk of data) at a first storage device (e.g., storage device 160 or 170 of FIG. 1) is received. In one embodiment, the first storage device is a disk array of a storage area network (SAN).

At step 420, it is determined whether the portion of data is sequentially accessed at the first storage device. If the portion of data is sequentially accessed at the first storage device, it is determined that the portion of data is not a candidate for migration to the second storage device, as shown at step 430. Alternatively, if the portion of data is not sequentially accessed at the first storage device, process 400 proceeds to step 440. It should be appreciated that step 420 is optional.

At step 440, the number of accesses of the portion of data at a first storage device is accumulated (e.g., counted). At step 450, the number of accesses is periodically decremented by a predetermined amount (e.g., amount of cooling 342 of FIG. 2). In one embodiment, the number of accesses is periodically decremented performed according to a predetermined time interval (e.g., cooling period 342 of FIG. 2). In one embodiment, the predetermined amount and the predetermined time interval are tunable. In one embodiment, the predetermined amount and the predetermined time interval are dynamically tunable.

With reference to FIG. 3B, at step 460 it is determined whether the portion of data is a candidate for migration to a second storage device (e.g., auxiliary cache resource 250 of FIG. 1) based at least in part on the number of accesses. In one embodiment, the second storage device is a SSD operating as an auxiliary cache resource coupled to the first storage device. In one embodiment, determining whether the portion of data is a candidate for migration to the second storage device is based on a comparison of the number of accesses to a threshold (e.g., threshold 370 of FIG. 2).

In one embodiment, as shown at step 470, it is determined whether the number of accesses exceeds the threshold. If the number of accesses does not exceed the threshold, it is determined that the portion of data is not a candidate for migration to the second storage device, as shown at step 430. Alternatively, if the number of accesses does exceed the threshold, it is determined that the portion of data is a candidate for migration to the second storage device, as shown at step 480.

At step 490, the portion of data is migrated to the second storage device. It should be appreciated that step 490 is optional.

Extensions and Alternatives

With reference again to FIG. 1, although certain embodiments of the present invention were described using an SSD for the auxiliary cache resource 250, the present invention is not limited to an SSD. For example, the auxiliary cache resource 250 may be, among other things, a disk array, such as a RAID, battery-backed Dynamic Random Access Memory (DRAM), Magnetic Random Access Memory (MRAM), Flash, or any type of device that can be used to temporarily and/or permanently store data.

Although certain embodiments of the present invention were described with the CMM 222 implemented in an appliance, such as a virtualization appliance 220, CMM 222 may reside in any or in a combination of an appliance 220, a fabric switch, a disk array, such as storage devices 160, 170, or another computer, such as clients 112, 114, 118. For example, CMM 222 may reside in storage device 160 instead of appliance 220. In a second example, CMM 222 may reside in client 114 instead of appliance 220. In a third example, part of CMM 222 may reside in appliance 220 and part of CMM 222 in storage device 160, etc. In the event that parts of the CMM 222 reside on different devices, controlling logic may be used for the various parts to communicate.

Although certain embodiments of the present invention were described with a virtualization appliance managing one auxiliary cache resource, the embodiments herein may pertain to a virtualization appliance managing more than one auxiliary cache resource. In this case, the virtualization appliance may maintain metadata for all of the auxiliary cache resources associated with it.

Although certain embodiments of the present invention were described using an auxiliary cache resource 250 solely for caching copies of portions of data 270, the auxiliary cache resource 250 may be used for other purposes in addition to caching copies of portions of data 270 as well.

The embodiments described herein may be used with mirroring the copies of the portions of data 270. For example, there may be two copies of A' and two copies of B'. These mirrored copies may be in one auxiliary cache resource or in different auxiliary cache resources.

CONCLUSION

Embodiments of the present invention relate generally to selective placement of data into a cache or a cache admission policy. By providing an alternative caching scheme 223 and an auxiliary caching resource 250, embodiments of the present invention greatly reduce the load of storage devices 160 and 170. Specifically, embodiments of the present invention reduce the overhead incurred as result of migrations between levels in a multi-level cache environment. It accomplishes this by applying a cooling process that preferentially selects candidate cache objects with more recent access activity, thereby reducing migration loads and associated overheads.

The MRFU cache placement policy described herein improves efficiency of hot data management in a multi-level caching scenario. It is not only a simple cache content management method, but a better hierarchy management technique. MRFU cache placement policy may enable new roles and markets for solid-state storage technologies by enabling good utilization of cache resources and justifying its cost.

Various embodiments of the present invention, a method for managing data storage, are described herein. While the present invention has been described in particular embodiments, it should be appreciated that the present invention should not be construed as limited by such embodiments, but rather construed according to the following claims.

What is claimed is:

1. A method for managing data storage, said method comprising:

accumulating a number of accesses of a portion of data at a first storage device;

periodically decrementing said number of accesses by a predetermined amount;

determining whether said portion of data is a candidate for migration to a second storage device based at least in part on said number of accesses;

determining whether said portion of data is sequentially accessed at said first storage device; and if said portion of data is sequentially accessed at said first storage device, determining that said portion of data is not a candidate for migration to said second storage device and, with said access counter, not accumulating a number of accesses, in which said periodically decrementing said number of accesses by a predetermined amount is performed according to a predetermined time interval, said predetermined amount and said predetermined time interval being tunable.

2. The method as recited in claim 1 wherein said determining whether said portion of data is a candidate for migration to said second storage device is based on a comparison of said number of accesses to a predetermined threshold.

3. The method as recited in claim 2 wherein said determining whether said portion of data is a candidate for migration to said second storage device comprises:

determining whether said number of accesses exceeds said predetermined threshold; and provided said number of accesses exceeds said predetermined threshold, determining that said portion of data is a candidate for migration to said second storage device.

4. The method as recited in claim 1 further comprising migrating said portion of data to said second storage device.

5. The method as recited in claim 1 wherein said first storage device is a disk array of a storage area network (SAN).

6. The method as recited in claim 1 wherein said second storage device is a solid state disk operating as an auxiliary cache resource coupled to said first storage device.

7. The method as recited in claim 1 wherein said predetermined amount and said predetermined time interval are dynamically tunable.

8. The method of claim 1, in which said predetermined amount and said predetermined time interval are separately tunable.

9. A non-transitory computer-usable medium having computer-readable program code embodied therein for causing a computer system to perform a method for managing data storage, said method comprising:

counting a number of times a chunk of data has been accessed at a first storage device;

in response to the lapsing of a predetermined time interval, periodically decreasing said number of accesses by a predetermined amount;

determining whether said chunk of data is a candidate for migration to a second storage device based at least in part on said number of accesses; and determining whether said chunk of data is sequentially accessed at said first storage device; and provided said chunk of data is sequentially accessed at said first storage device, determining that said chunk of data is not a candidate for migration to said second storage device and counting said sequential access as a single access of said number of accesses, in which said periodically decreasing said number of accesses by a predetermined amount is performed according to a predetermined time interval, said predetermined amount and said predetermined time interval being tunable.

10. The computer-usable medium as recited in claim 9 wherein said determining whether said chunk of data is a candidate for migration to said second storage device is based on a comparison of said number of accesses to a predetermined threshold.

11. The computer-usable medium as recited in claim 10 wherein said determining whether said chunk of data is a candidate for migration to said second storage device comprises:
 determining whether said number of accesses is greater than said predetermined threshold; and
 provided said number of accesses is greater than said predetermined threshold, determining that said chunk of data is a candidate for migration to said second storage device.

12. The computer-usable medium as recited in claim 9 wherein said method further comprises migrating said chunk of data to said second storage device.

13. The computer-usable medium as recited in claim 9 wherein said first storage device is a disk array of a storage area network (SAN).

14. The computer-usable medium as recited in claim 9 wherein said second storage device is a solid state disk operating as an auxiliary cache resource coupled to said first storage device.

15. The computer-usable medium as recited in claim 9 wherein said predetermined amount and said predetermined time interval are dynamically tunable.

16. A system for managing data storage, said system comprising:
 an access counter for accumulating a number of accesses of a portion of data at a first storage device, said access counter operable to periodically decrement said number of accesses by a predetermined amount; and
 a migration candidate selector for determining whether said portion of data of is a candidate for migration to a second storage device based at least in part on said number of accesses,
 wherein said migration candidate selector is operable to determine whether said portion of data is sequentially accessed at said first storage device such that provided said portion of data is sequentially accessed at said first storage device, it is determined that said portion of data is not a candidate for migration to said second storage device, and
 in which if said portion of data is sequentially accessed, then, with said access counter, not accumulating a number of accesses.

17. The system as recited in claim 16 wherein said migration candidate selector determines whether said portion of data is a candidate for migration to said second storage device based on a comparison of said number of accesses to a predetermined threshold.

18. The system as recited in claim 17 wherein said migration candidate selector is operable to determine that said portion of data is a candidate for migration to said second storage device provided said number of accesses exceeds said predetermined threshold.

* * * * *

UNITED STATES PATENT AND TRADEMARK OFFICE
CERTIFICATE OF CORRECTION

| | | |
|---|---|---|
| PATENT NO. | : 8,688,904 B1 | Page 1 of 1 |
| APPLICATION NO. | : 11/136593 | |
| DATED | : April 1, 2014 | |
| INVENTOR(S) | : Ismail Ari et al. | |

It is certified that error appears in the above-identified patent and that said Letters Patent is hereby corrected as shown below:

On the Title Page, item (57), Abstract, in column 2, line 2, before "A number" insert -- A method for managing data storage. --.

In the Claims

In column 14, line 8, in Claim 16, delete "of is" and insert -- is --, therefor.

Signed and Sealed this
Twelfth Day of August, 2014

Michelle K. Lee
*Deputy Director of the United States Patent and Trademark Office*